US012531643B2

(12) United States Patent
Zhang et al.

(10) Patent No.: US 12,531,643 B2
(45) Date of Patent: Jan. 20, 2026

(54) PER-BAND BEAM REPORT

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 17/804,552

(22) Filed: May 27, 2022

(65) Prior Publication Data

US 2023/0388031 A1    Nov. 30, 2023

(51) Int. Cl.
*H04B 17/336* (2015.01)
*H04B 7/06* (2006.01)
*H04L 5/14* (2006.01)
*H04W 24/10* (2009.01)

(52) U.S. Cl.
CPC ......... *H04B 17/336* (2015.01); *H04B 7/0626* (2013.01); *H04L 5/14* (2013.01); *H04W 24/10* (2013.01); *H04B 7/0639* (2013.01)

(58) Field of Classification Search
CPC .. H04B 17/336; H04B 17/318; H04B 17/345; H04L 5/14; H04W 24/10
See application file for complete search history.

(56) References Cited

U.S. PATENT DOCUMENTS

| 2020/0228182 | A1* | 7/2020 | Nilsson | H04B 7/0647 |
| 2020/0245166 | A1* | 7/2020 | Kwak | H04B 7/024 |
| 2021/0409174 | A1* | 12/2021 | Yum | H04L 5/0048 |
| 2023/0189382 | A1* | 6/2023 | Haustein | H04W 76/20 370/329 |
| 2025/0266915 | A1* | 8/2025 | Khan Beigi | H04L 1/0026 |

OTHER PUBLICATIONS

Elgendi et al., "Interference Measurement Methods in 5G NR: Principles and Performance", 2019, IEEE (Year: 2019).*

* cited by examiner

*Primary Examiner* — Christopher M Crutchfield
*Assistant Examiner* — Aixa A Guadalupe Cruz
(74) *Attorney, Agent, or Firm* — ArentFox Schiff, LLP

(57) ABSTRACT

In certain aspects, the disclosure is directed to a user equipment (UE) configured to provide a report of interference (e.g., cross-link interference) between the UE and another UE when receiving a downlink transmission from a full duplex base station. In some examples, the UE may obtain, from the base station, a first channel measurement resource (CMR) via a first beam over a first subband, and a second CMR via a second beam over a second subband. In some examples, the UE may obtain, from another UE, a first interference management resource (IMR) via the first subband, and a second IMR via the second subband. Based on the CMR and IMR, the UE may generate a report indicating detected interference.

28 Claims, 11 Drawing Sheets

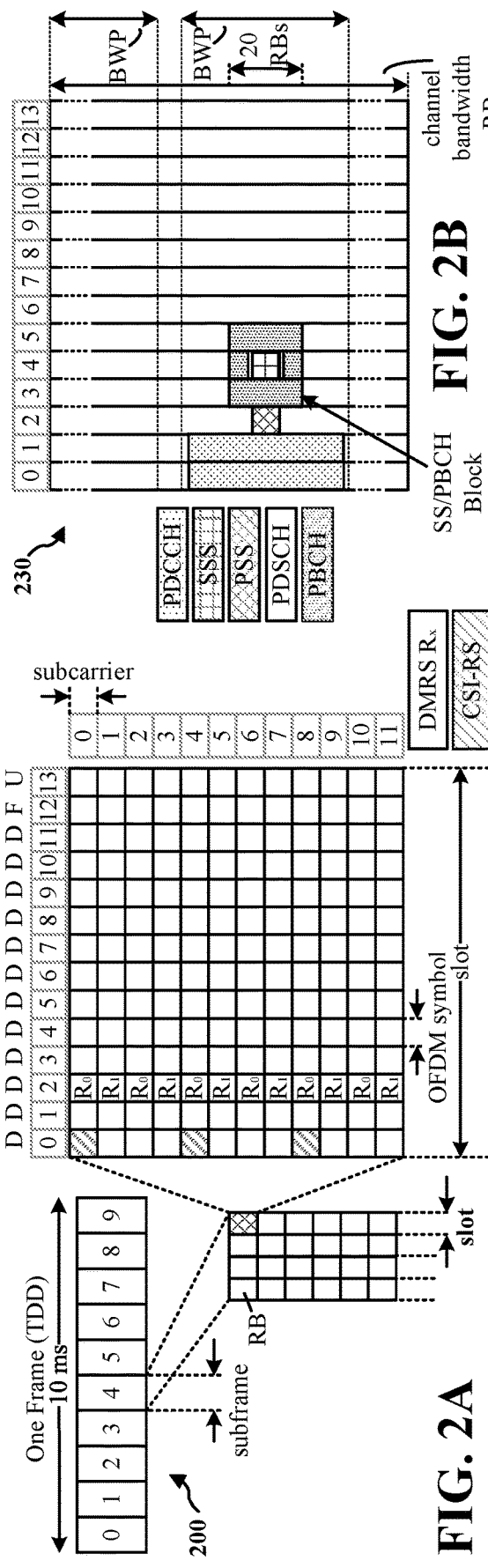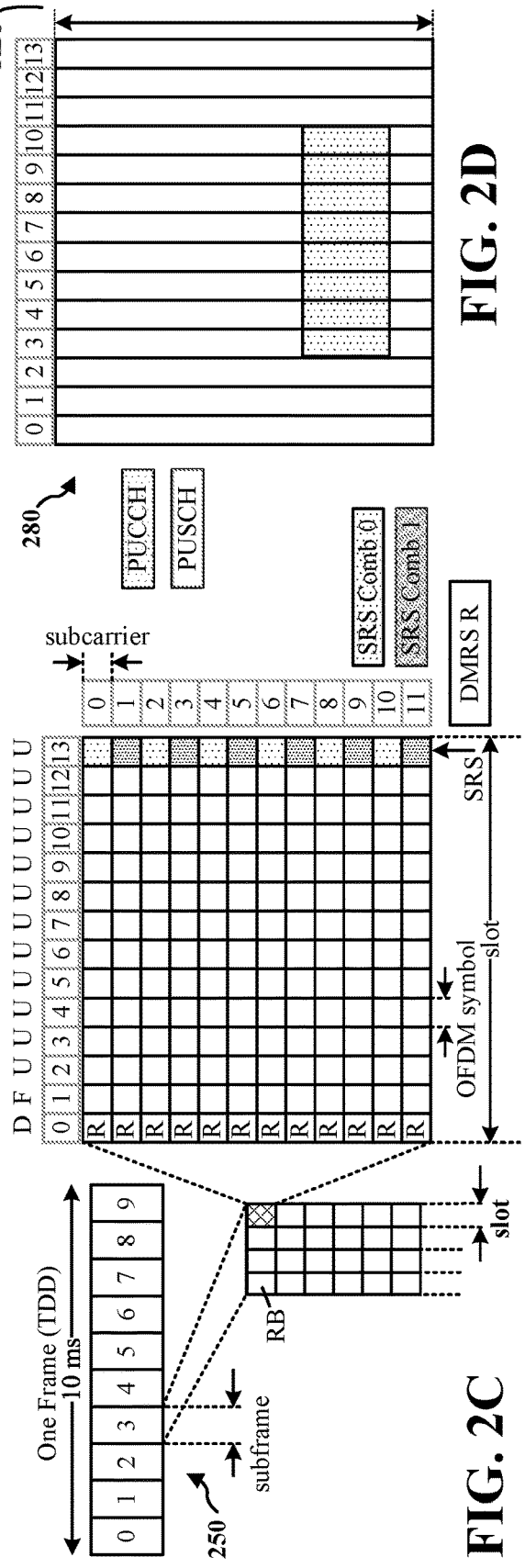
FIG. 2A
FIG. 2B
FIG. 2C
FIG. 2D

PER-BAND BEAM REPORT

BACKGROUND

Technical Field

The present disclosure generally relates to communication systems, and more particularly, to communicating a per-band beam report between wireless devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communication by a first user equipment. In some examples, the method includes obtaining, from a network node, a first channel measurement resource (CMR) via a first beam over a first subband, and a second CMR via a second beam over a second subband. In some examples, the method includes obtaining, from a second user equipment (UE), a first interference management resource (IMR) via the first subband, and a second IMR via the second subband. In some examples, the method includes generating a report comprising a first indication of a first communication parameter for the first subband, and a second indication of a second communication parameter for the second subband, wherein the first communication parameter is based at least on the first CMR and the first IMR, wherein the second communication parameter is based at least on the second CMR and the second IMR. In some examples, the method includes outputting the report for transmission to the network node.

Certain aspects are directed to a method for wireless communication by a network node. In some examples, the method includes outputting, for transmission via a first beam, a first channel measurement resource (CMR) over a first subband. In some examples, the method includes outputting, for transmission via a second beam, a second CMR over a second subband. In some examples, the method includes obtaining, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE.

Certain aspects are directed to an apparatus configured for wireless communication. The apparatus may include a memory comprising instructions, and one or more processors configured to execute the instructions. In some examples, the one or more processors may be configured to obtain, from a network node, a first channel measurement resource (CMR) via a first beam over a first subband, and a second CMR via a second beam over a second subband. In some examples, the one or more processors may be configured to obtain, from a first user equipment (UE), a first interference management resource (IMR) via the first subband, and a second IMR via the second subband. In some examples, the one or more processors may be configured to generate a report comprising a first indication of a first communication parameter for the first subband, and a second indication of a second communication parameter for the second subband, wherein the first communication parameter is based at least on the first CMR and the first IMR, wherein the second communication parameter is based at least on the second CMR and the second IMR. In some examples, the one or more processors may be configured to output the report for transmission to the network node.

Certain aspects are directed to an apparatus configured for wireless communication. The apparatus may include a memory comprising instructions, and one or more processors configured to execute the instructions. In some examples, the one or more processors may be configured to output, for transmission via a first beam, a first channel measurement resource (CMR) over a first subband. In some examples, the one or more processors may be configured to output, for transmission via a second beam, a second CMR over a second subband. In some examples, the one or more processors may be configured to obtain, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE.

Certain aspects are directed to a non-transitory computer-readable medium having instructions stored thereon that, when executed by a first user equipment (UE), cause the first UE to perform operations. In some examples, the operations include obtaining, from a network node, a first channel measurement resource (CMR) via a first beam over a first subband, and a second CMR via a second beam over a second subband. In some examples, the operations include obtaining, from a second user equipment (UE), a first interference management resource (IMR) via the first subband, and a second IMR via the second subband. In some examples, the operations include generating a report comprising a first indication of a first communication parameter for the first subband, and a second indication of a second communication parameter for the second subband, wherein the first communication parameter is based at least on the first CMR and the first IMR, wherein the second communication parameter is based at least on the second CMR and the second IMR. In some examples, the operations include outputting the report for transmission to the network node.

Certain aspects are directed to a non-transitory computer-readable medium having instructions stored thereon that, when executed by a network node, cause the network node to perform operations. In some examples, the operations include outputting, for transmission via a first beam, a first channel measurement resource (CMR) over a first subband. In some examples, the operations include outputting, for transmission via a second beam, a second CMR over a second subband. In some examples, the method includes obtaining, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
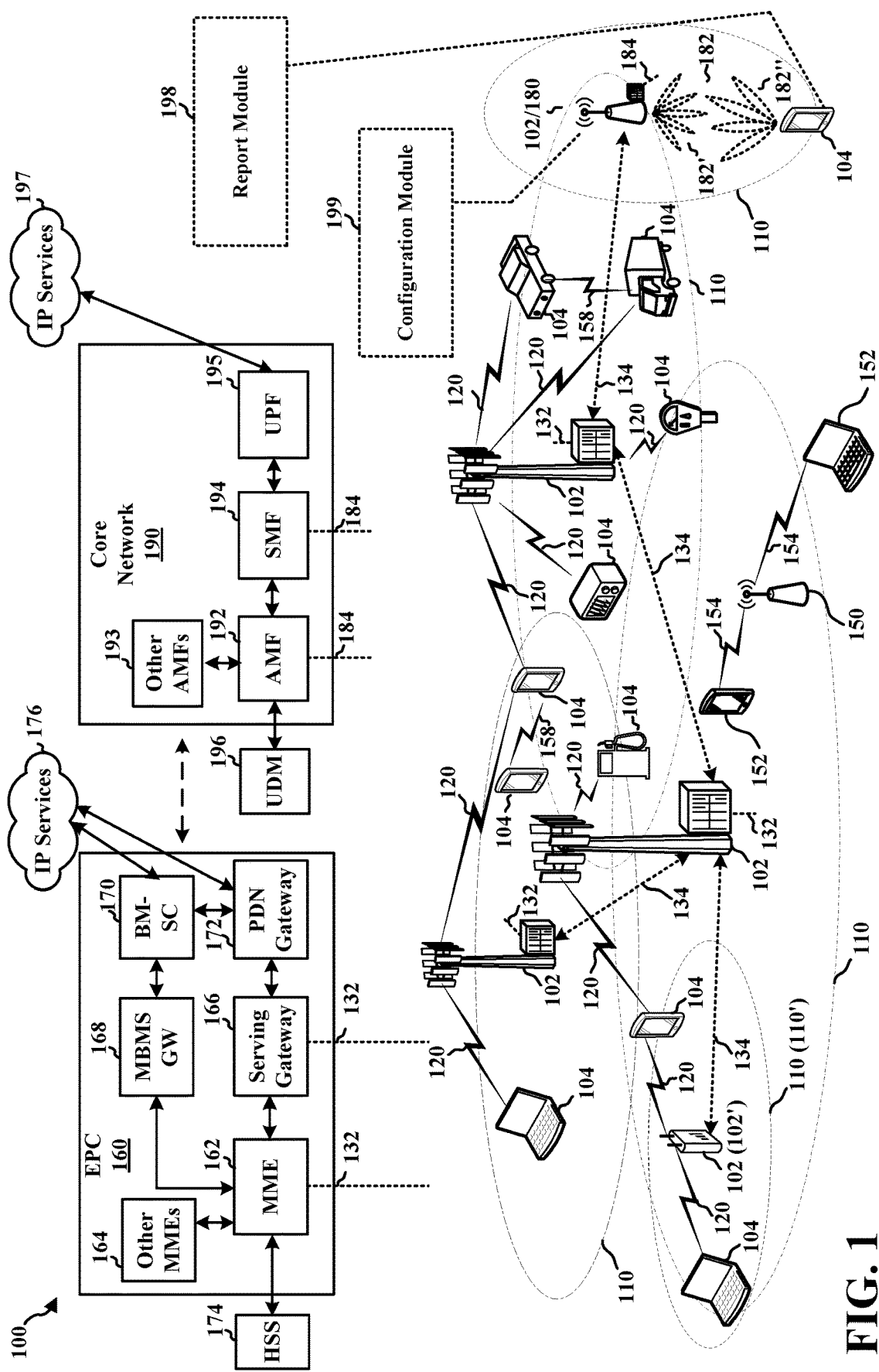
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In many existing wireless communication systems, a cellular network is implemented by enabling wireless user equipment (UEs) to communicate with one another through signaling with a nearby base station or cell. Interference with the signaling between a base station and UE may occur in such cellular networks. One type of interference occurs when a first UE transmits an uplink signal at substantially the same time as a nearby second UE receives a downlink signal. The uplink signal may interfere with the reception of the downlink signal by the second UE. This type of interference is sometimes referred to as cross link interference (CLI), or more specifically, UE-to-UE CLI.

As wireless communications become more ubiquitous, they also become more sophisticated. In one example, advances in full duplex communications may result in a base station capable of full-duplex communication by receiving an uplink signal while simultaneously transmitting a downlink signal. For example, the base station may transmit the downlink signal to a first UE via a first antenna panel using a first frequency band (e.g., subband or bandwidth part (BWP)), while receiving the uplink signal from a second UE via a second antenna panel using a second frequency band (e.g., subband or bandwidth part (BWP)). However, in such an example, the uplink and downlink signaling may cause CLI between the first UE and the second UE.

In certain aspects, the first UE may generate and transmit a beam management report based on one or more of a channel measurement resource (CMR) or an interference measurement resource (IMR) configured by the base station. The base station may initially configure the first UE with an indication of the resources to use for CMR and optionally IMR, that the first UE may use to perform level 1 reference signal received power (L1-RSRP) measurements and/or level one signal-to-interference-plus-noise ratio (L1-SINR) measurements.

However, a conventional beam management report may not distinguish between multiple frequency bands, such as those used by a full duplex base station where multiple frequency bands may be available for uplink and downlink transmissions. As such, the conventional report may not provide the base station with information about more than one frequency band, or even distinguish between multiple frequency bands.

Thus, in certain aspects, the disclosure is directed to a CLI-aware L1 subband beam management report. For instance, a full duplex base station may simultaneously communicate with a first UE and a second UE, wherein the base station transmits a downlink signal to the first UE while receiving an uplink signal from the second UE. In this example, the first UE may experience CLI caused the uplink signal which may reduce the quality of the downlink signal. However, if the first UE receives the downlink signal over a different beam and/or subband, the CLI may be reduced.

In one example, the base station may provide the first UE with: (i) an indication of one or more CMRs (e.g., synchronization signal block (SSB) based and/or channel state information reference signal (CSI-RS) based, transmitted by the base station) and (ii) an indication of one or more IMRs (e.g., a sounding reference signal (SRS), a physical uplink control channel (PUCCH) signal, a physical random access channel (PRACH) signal, non-zero power (NZP) CSI-RS, and/or zero power (ZP) CSI-IMR) transmitted by the second UE. That is, CMR and IMR allow the first UE to perform interference measurements on predetermined resources configured for the first UE by the base station. Based on this information, the first UE may perform intra-cell interference measurement based on received signals from CMR and IMR over multiple subbands and/or beams to determine which subband(s) and/or beam(s) have the least interference (e.g., which subband(s) and/or beam(s) are preferred for receiving the downlink signal, so as to reduce CLI). It should be noted that inter-cell interference measurements may also be performed to the same end, as discussed below Based on the measurements, the first UE may provide a beam management report to the base station with an indication of one or more preferred beams for each subband of a plurality of subbands. In some examples, the indication provided in the report may be an L1-RSRP or L1-SINR measurement of each preferred beam for each subband. In another example, the indication provided in the report may be an indication of which CMR is associated with the preferred beam for a particular subband. In this example, the base station may transmit signaling over a first CMR (CMR1) associated with a first beam and transmit signaling over a second CMR (CMR2) associated with a second beam, wherein the first beam and the second beam have different spatial directions. CMR1 may be transmitted via the first beam using multiple subbands, and CMR2 may be transmitted via the second beam using one or more of the same multiple subbands. Thus, if the first UE measures less CLI from the first beam relative to the second beam in subband 1 and measures less CLI from the second beam relative to the first beam in subband 2, then the UE may report an indication of CMR1 for subband 1 and an indication of CMR2 for subband 2.

The base station may then determine to transmit downlink signaling to the first UE over a preferred beam and/or subband to reduce interference affecting the downlink signaling at the first UE. For example, by providing the base station with an indication of preferred beams per subband, the base station may determine which beams or beam pairs to use for communication with the first UE if scheduling the first UE for a downlink transmission over a particular subband.

It should be noted that such operations may result in reduced resources configured by the base station. For example, the first UE may perform interference measurements using the same CMR1 and IMR across different subbands, thereby foregoing a need for a separate CMR/IMR to be configured for each subband. This reduced configuration may also reduce communication latency and improve spectrum efficiency at each UE within the cell.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Throughout the disclosure, a "network node" may be used to refer to a base station, a component of the base station, or a user equipment (UE). A base station can be implemented as an aggregated base station (e.g., FIG. 4), as a disaggregated base station (e.g., FIG. 5), an integrated access and backhaul (IAB) node, a relay node, a sidelink node, etc. Accordingly, a network node may refer to one or more of a central unit (CU), a distributed unit (DU), a radio unit (RU), a near-real time (near-RT) radio access network (RAN) intelligent controller (RIC), or a non-real time (non-RT) RIC.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may be include a configuration module 199 for outputting, for transmission via a first downlink beam, a first channel measurement resource (CMR) transmitted over a first subband; outputting, for transmission via a second downlink beam, a second CMR via transmitted over a second subband; obtaining, from a first user equipment (UE), a first interference management resource (IMR) via the first subband, and a second IMR via the second subband; and obtaining, from a first user equipment (UE), a report comprising an indication of a first communication parameter for the first subband, and an indication of a second communication parameter for the second subband, wherein the first communication parameter is determined based at least on the first CMR and a first IMR transmitted by a second UE, wherein the second communication parameter is determined based at least on the second CMR and a second IMR transmitted by the second UE, wherein the report maps the indication of the first communication parameter to the first subband, and wherein the report maps the indication of the second communication parameter to the second subband.

Referring again to FIG. 1, in certain aspects, the UE 104 may include a report module 198 for obtaining, from a base station, a first channel measurement resource (CMR) via a first downlink beam transmitted over a first subband, and a second CMR via a second downlink beam transmitted over a second subband; obtaining, from a first user equipment (UE), a first interference management resource (IMR) via the first subband, and a second IMR via the second subband; and outputting, for transmission to the base station, a report comprising an indication of a first communication parameter for the first subband, and an indication of a second communication parameter for the second subband, wherein the first communication parameter is determined based at least on the first CMR and the first IMR obtained over the first subband, wherein the second communication parameter is determined based at least on the second CMR and the second IMR obtained over the second subband, wherein the report maps the indication of the first communication parameter to the first subband, and wherein the report maps the indication of the second communication parameter to the second subband.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL. As used herein, "channel quality" or "beam quality" may relate to a measured value indicative of a level of interference over a particular downlink beam over a particular subband.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
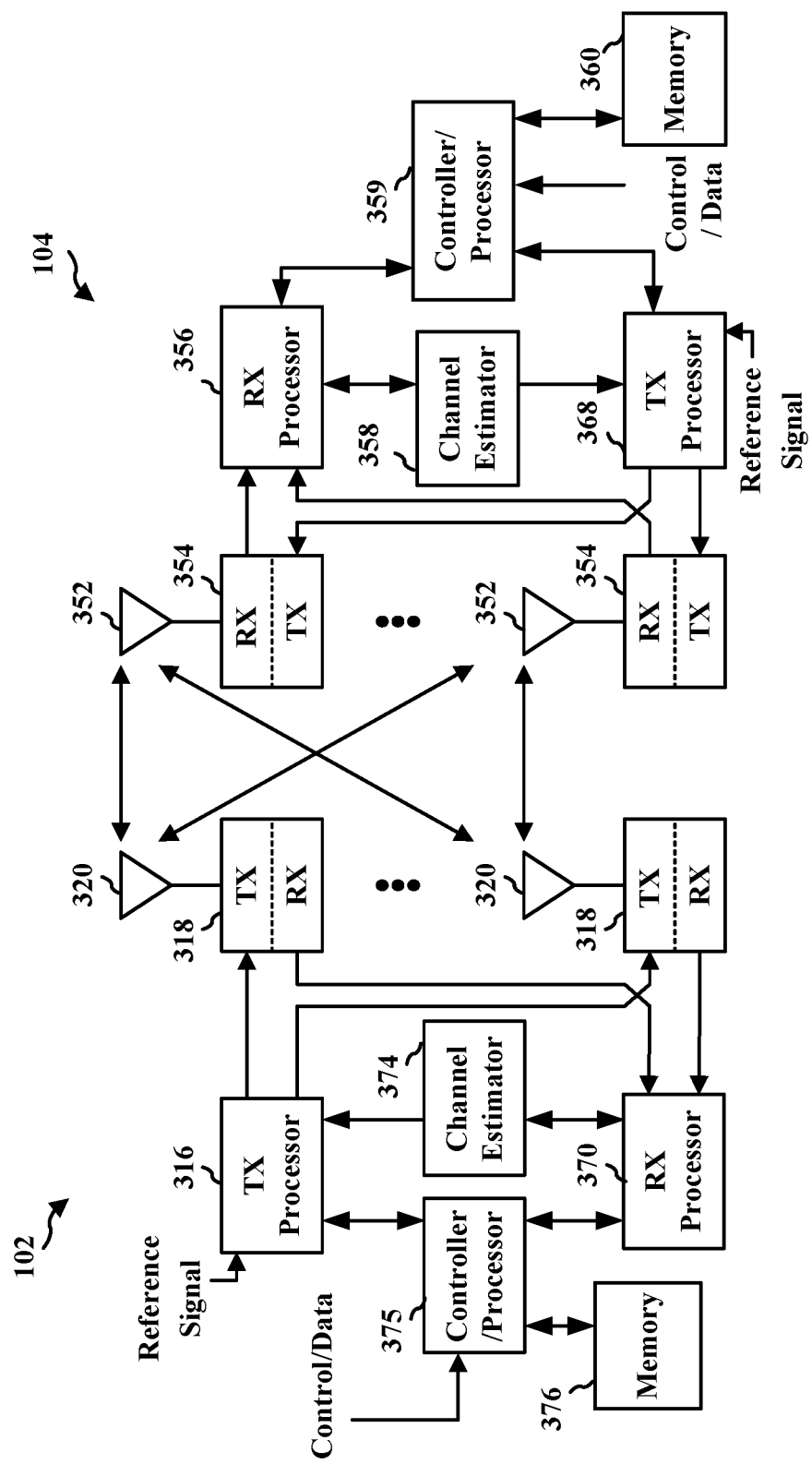
FIG. 3 is a diagram illustrating an example of a base station and user equipment (UE) in an access network.

FIG. 3 is a block diagram of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the report module 198 of FIG. 1.

At least one of the TX processor 316, the RX processor 370, and the controller/processor 375 may be configured to perform aspects in connection with the configuration module 198 of FIG. 1.

Figure 4:
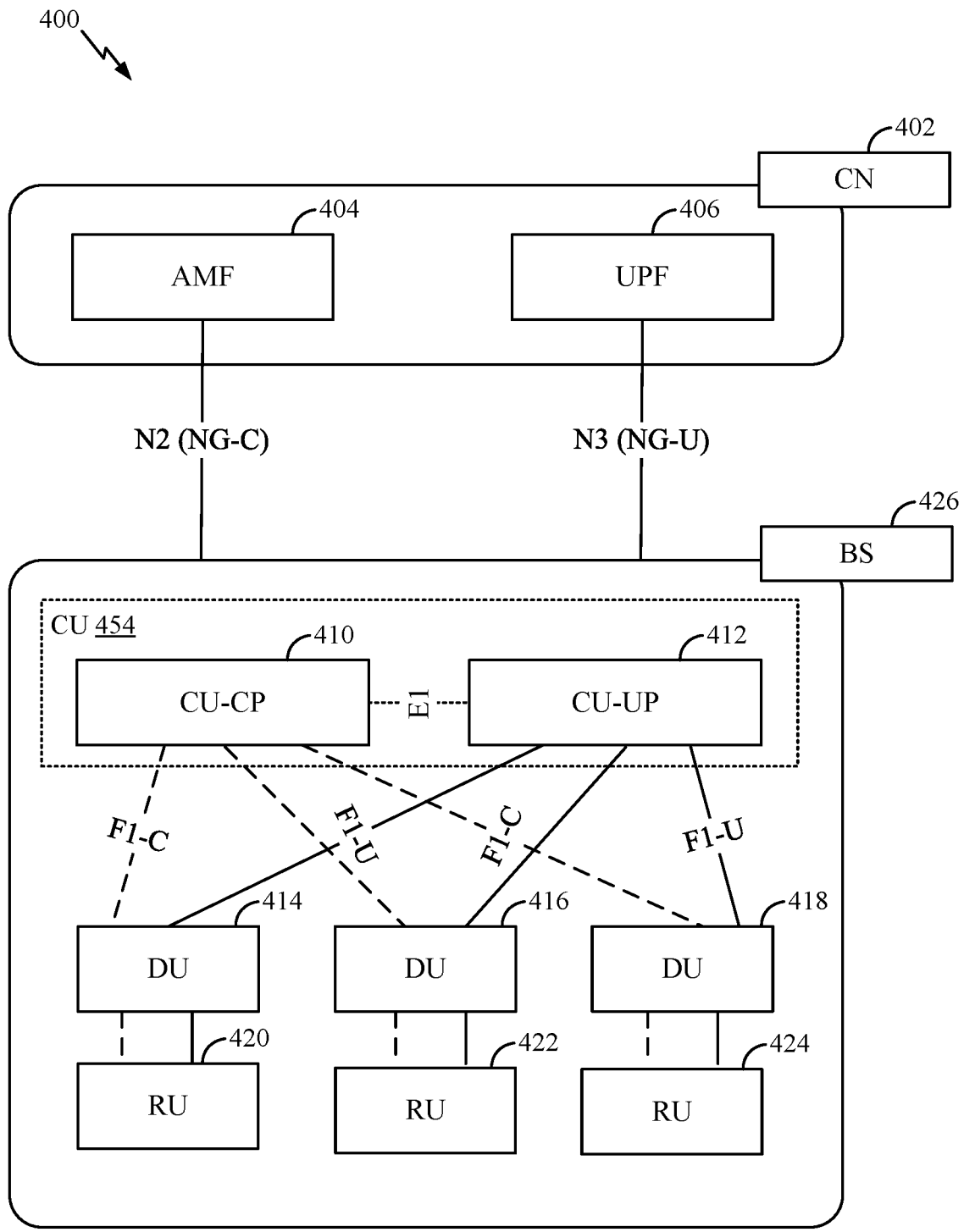
FIG. 4 is a block diagram illustrating an example monolithic (e.g., aggregated) base station and architecture of a distributed radio access network (RAN).

FIG. 4 illustrates an example monolithic (e.g., disaggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
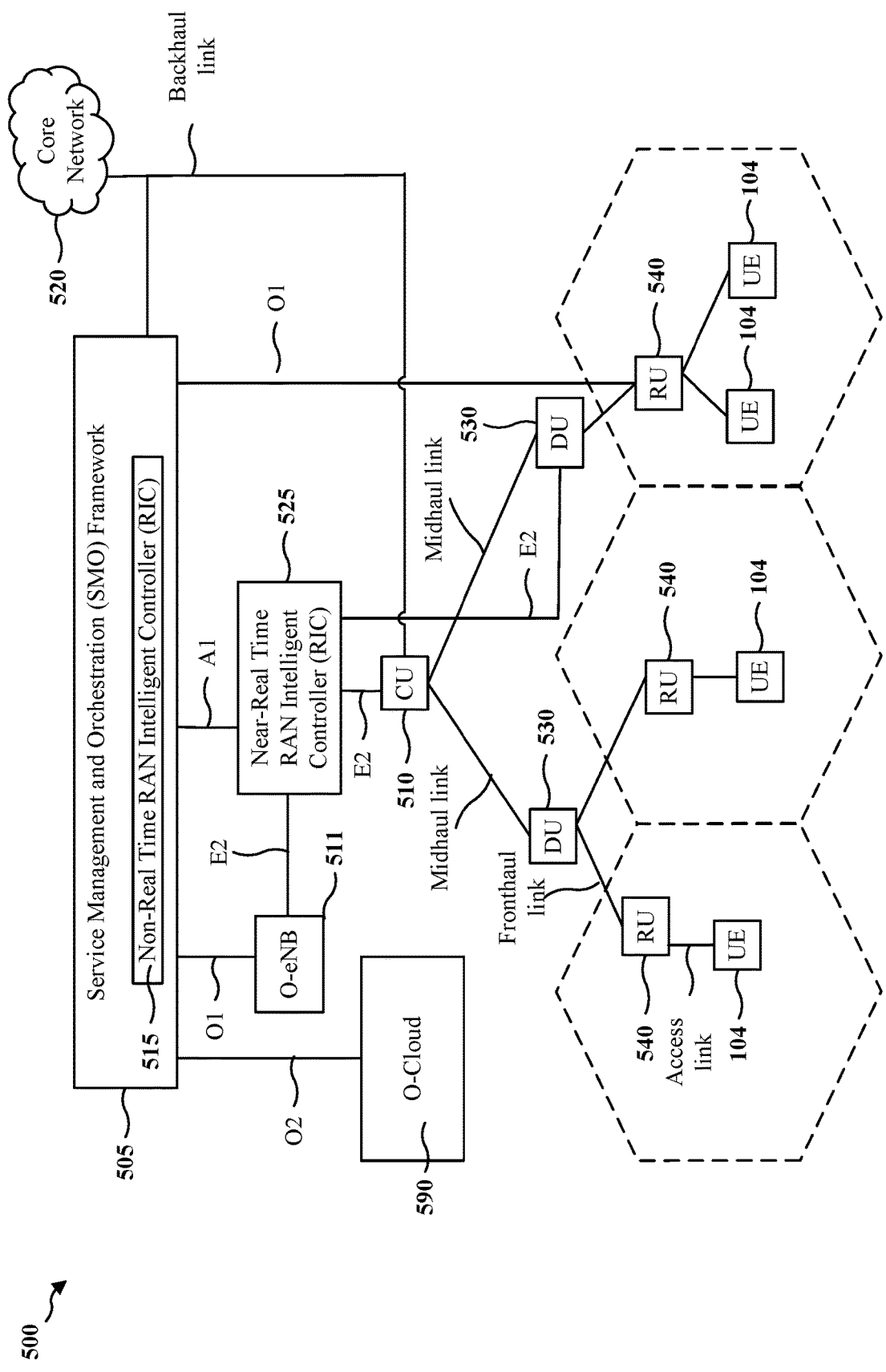
FIG. 5 is a block diagram illustrating an example disaggregated base station architecture.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit-user plane (CU-UP)), control plane functionality (i.e., central unit-control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Figure 6A:
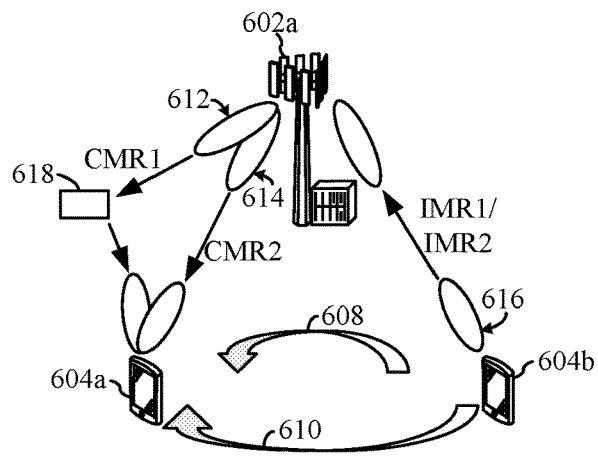
FIGS. 6A-6C are diagrams illustrating example instances of cross link interference (CLI).
Figure 6B:
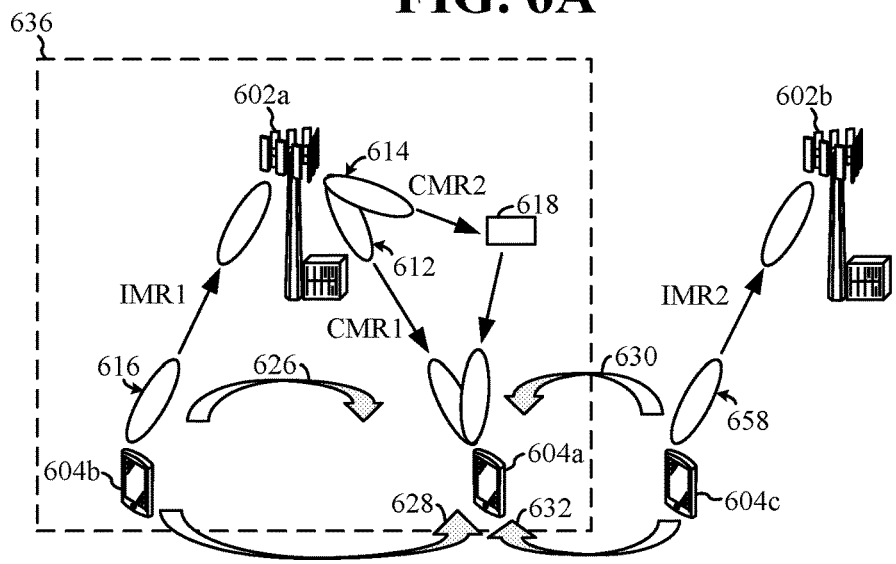

Example Techniques for Generating and Transmitting a Subband Beam Management Report FIGS. 6A and 6B are diagrams illustrating examples of intra-cell interference and inter-cell interference. Initially, a first UE 604a may be configured by a network node 602a (e.g., base station 102 of FIGS. 1 and 3) with at least one channel measurement resource (CMR) and at least one interference measurement resource (IMR) for computing a level 1 (L1) communication parameter (e.g., signal-to-interference-plus-noise ratio (SINR) and/or reference signal received power (RSRP)). The CMR may be synchronization signal block (SSB) or a reference signal (e.g., CSI-RS). The IMR may be NZP-IMR (e.g., NZP CSI-RS) or ZP-IMR (e.g., CSI-IM). The CMR may correspond to downlink transmission resources used by the network node 602a, while the IMR may correspond to uplink transmission resources used by a second UE 604b and/or a third UE 604c. It should be noted that the IMR may be configured for CLI measurements so that the first UE 604a may measure CLI caused by uplink transmissions from one or more of the second UE 604b and/or the third UE 604c that leak into downlink transmissions received by the first UE 604a.

In some examples, first UE 604a may be configured with a CMR set that includes multiple CMRs and an IMR set that includes multiple IMRs. The CMRs and the IMRs may be 1-to-1 mapped to each other. For example, a first CMR (e.g., CMR1) may be mapped to a first IMR (e.g., IMR1), and a second CMR (e.g., CMR2) may be mapped to a second IMR (e.g., IMR2). In one embodiment, the network node 602a may configure time and frequency resources for each CMR and corresponding IMR, and transmit the configurations to the first UE 604a via higher layer signaling (e.g., via the medium access control (MAC) control element (CE), or the radio resource control (RRC) signaling). A CMR and corresponding IMR may have the same periodicity and time-domain behavior (e.g. periodic, semi-persistent, or aperiodic).

Figure 6C:
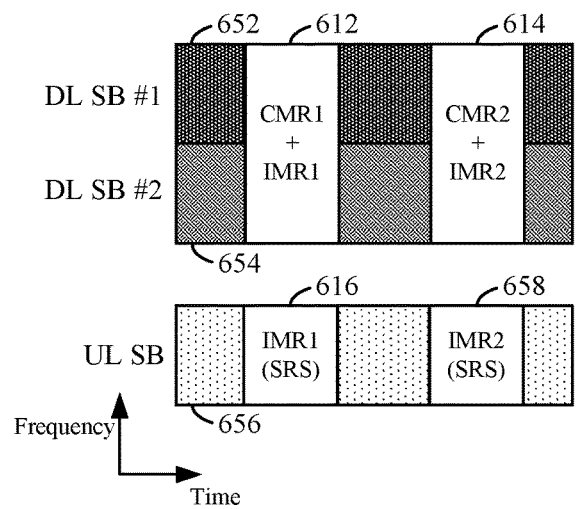

FIG. 6C is a block diagram illustrating a conceptual example of different subbands, including a first downlink subband (DL SB #1) 652, a second downlink subband (DL SB #2) 654, and an uplink subband (UL SB) 656 used in the examples of FIGS. 6A and 6B. The network node 602a may transmit downlink signaling via one or more of a first beam 612 and a second beam 614 using one or more of the first downlink subband 652 and the second downlink subband 654. The second UE 604b may transmit uplink signaling using one or more of a third beam 616 and a fourth beam 658 via the uplink subband 656.

Referring to FIG. 6A, a first UE 604a and a second UE 604b (e.g., UEs 104 of FIGS. 1 and 3) communicate with a network node 602a (e.g., base station 102 of FIGS. 1 and 3) that is capable of full-duplex communication. This example illustrates intra-cell cross link interference (CLI) 608/610 experienced by the first UE 604a as a result of uplink signaling by the second UE 604b. Here, the network node 602a transmits downlink signaling to the first UE 604a via a first beam 612 and a second beam 614. The downlink signaling of the first beam 612 includes CMR1 and the downlink signaling of the second beam 614 includes CMR2. CMR1 may be transmitted via the first beam 612 using one or more of the first downlink subband 652 and the second downlink subband 654, and CMR2 may be transmitted via the second beam 614 using at least one of the same one or more subbands used by the first beam 612. As shown, the first beam 612 has a different spatial direction relative to the second beam 614, and the first beam 612 is also reflected in a direction toward the first UE 604a by a structure 618 (e.g., building, repeater, relay, etc.).

The second UE 604b is shown as transmitting an uplink signal via the third beam 616 to the network node 602a, where the uplink signal includes IMR1. The second UE 604b may also transmitting another uplink signal via the fourth beam 658 to the network node 602a, where the other uplink signal includes IMR2. Here, the uplink signals may cause a degree of intra-cell CLI from the perspective of the first UE 604a. For example, the uplink signal may create high cross link interference (CLI) 608 (relative to a low CLI 610 described below) with the downlink signal received via the second beam 614. For example, the high CLI 608 may be due to the second beam 614 and the third beam 616 being relatively spatially close which may introduce a relatively high amount of signal leakage from the third beam 616. In another example, the relatively high amount of signal leakage may be due to the third beam 616 being transmitted using an uplink subband that is adjacent to a subband used by the second beam 614.

In contrast, the uplink signal may create low CLI 610 (relative to the high CLI 608) with the downlink signal received via the first beam 612. That is, the low CLI 610 may be a reduced amount of CLI or no CLI relative to the high CLI 608. For example, as illustrated, the first beam 612 is spatially distanced from the third beam 616, and thus, there may be very little uplink signal leakage received by the first UE 604a as interference. The first beam 612 may also use a subband that has a relatively high spatial separation from the subband used by the uplink beam (e.g., high degree of spatial separation relative to the subband used by the second beam 614).

FIG. 6B illustrates the first UE 604a and the second UE 604b communicating with network node 602a within a first cell 636, as well as a third UE 604c communicating with another network node 602b in another serving cell. This example illustrates potential intra-cell and inter-cell interference experienced by the first UE 604a as a result of uplink signaling by the second UE 604b and the third UE 604c. Here, the network node 602a transmits downlink signaling to the first UE 604a via a first beam 612 and a second beam 614. The downlink signaling of the first beam includes CMR1 and the downlink signaling of the second beam includes CMR2. CMR1 may be transmitted via the first beam 612 using one or more subbands, and CMR2 may be transmitted via the second beam 614 using at least one of the same one or more subbands used by the first beam 612. As shown, the second beam 614 has a different spatial direction relative to the first beam 612 and is reflected in a direction toward the first UE 604a by a structure 618 (e.g., building, repeater, relay, etc.).

The second UE 604b is shown transmitting an uplink signal via an uplink subband 656 to the network node 602a via a third beam 616. The uplink signal may include IMR1 that corresponds to CMR1. The third UE 604c is illustrated as transmitting an uplink signal via a fourth beam 658 to the other network node 602b. The fourth beam 658 and the third beam 616 may be transmitted via the same uplink subband 656, or different uplink subbands. As a result, the first UE 604a may experience inter-cell CLI caused by the uplink transmission of the third UE 604c. Here, the fourth beam 658 may cause high CLI 630 to the downlink signal transmitted over the second beam 614 due to the second beam 614 and the fourth beam 658 being spatially close, or due to the second beam 614 and the fourth beam 658 using adjacent subbands.

Downlink signaling communicated via the first beam 612 may experience relatively lower CLI 632 because the first beam 612 and the fourth beam 658 are pointed away from each other and/or because the first beam 612 and the fourth beam 658 use non-adjacent subbands.

The uplink signal transmitted by the second UE 604b may cause a degree of intra-cell CLI from the perspective of the first UE 604a. For example, the uplink signal may create high CLI 626 relative to a low CLI 628 between the uplink signal of the third beam 616 and the second beam 614.

Referring now to FIG. 6C, the first UE 604a may be configured to receive a downlink signal from the network node 602a by the first beam 612 via the first downlink subband 652 and the second downlink subband 654. That is, two instances of the same beam (e.g., same spatial direction) may be used to transmit a downlink signal that includes CMR1 over each subband. Similarly, the first UE 604a may be configured to receive a downlink signal from the network node 602a by a second beam 614 via the first downlink subband 652 and the second downlink subband 654, wherein the downlink signal for each subband includes CMR2. Thus, the first UE 604a is receiving downlink signaling from four different combinations of the two downlink beams 612/614 and the two downlink subbands 652/654. The first beam 612 and the second beam 614 may be spatially separated (e.g., the first beam 612 is defined by a first spatial direction, and the second beam 614 is defined by a second spatial direction).

Here, the first UE 604a may use CMR1 and CMR2 to perform channel measurement, and use the corresponding IMR1 and IMR2 to determine CLI. For example, the first UE 604a may determine a signal strength (e.g., RSRP) of CMR1 and CMR2 for each subband, as well as a signal strength of IMR1 and IMR2 for each subband. The first UE 604a may then calculate: (i) a first SINR based on the corresponding signal strengths of CMR1 and IMR1 of the first beam 612 for the first downlink subband 652; (ii) a second SINR based on the corresponding signal strengths of CMR1 and IMR1 of the first beam 612 for the second downlink subband 654; (iii) a third SINR based on the corresponding signal strengths of CMR2 and IMR2 of the second beam 614 for the first downlink subband 652; and (iv) a fourth SINR based on the corresponding signal strengths of CMR2 and IMR2 of the second beam 614 for the second downlink subband 654. The first UE 604a may then report the one or more of the calculated SINRs and/RSRPs to the network node 602a. For example, the first UE 604*a* may transmit a beam report to the network node 602*a* indicating a preferred beam for each subband based on measured interference caused by the uplink signaling from the second UE 604*b* and/or the third UE 604*c*. The preferred beam may be a beam with a highest calculated SINR.

Figure 7:
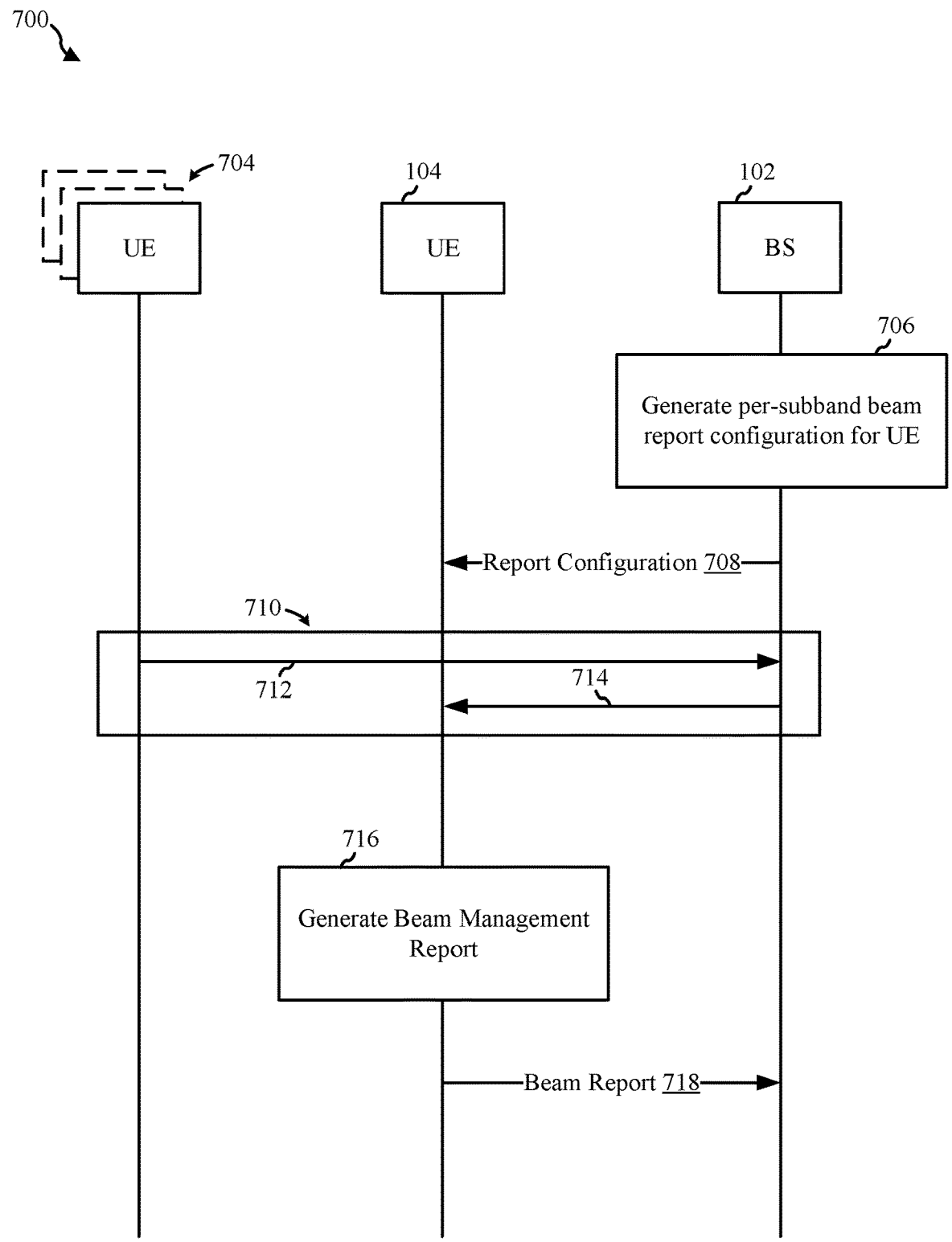
FIG. 7 is a call-flow diagram illustrating example communications of a per-band beam report.

FIG. 7 is a call-flow diagram illustrating example communications 700 between a UE 104 and a full-duplex base station 102.

Initially, at a step 706, the base station 102 may generate a per-subband beam report configuration for the UE 104. The configuration may provide the UE 104 with parameters for generating a per-subband beam report. That is, the UE 104 may generate a beam report for the base station 102 indicating which one or more beams or beam pairs for each subband of a plurality of subbands that the UE prefers for downlink transmission. A beam or beam pair may be preferred if it has low CLI relative to other beams used in the same subband. For example, if the UE 104 receives downlink signaling over two different beams over a subband, the UE 104 may prefer the beam that has less interference from an uplink communication from another UE (e.g., one or more UEs 704).

In some examples, the per-subband beam report configuration may configure the UE 104 to report all or fewer than all the beams over which the UE 104 receives downlink signaling from the base station 104. For example, the per-subband beam report configuration may provide a value (e.g., x) such as a non-zero integer indicating the number of beams for which the UE 104 may identify for each subband in its report. Accordingly, if x=2, then the UE 104 may identify up to two beams for each subband. For example, if the UE 104 receives downlink signaling from four beams over a subband, then the UE 104 may identify two of the four beams that are preferred (e.g., the two beams out of the four that have the lowest or no CLI).

In some examples, the per-subband beam report configuration may configure the UE 104 with one or more CMR and IMR for the UE 104 to use for measuring interference on one or more beams in each subband. In other words, the base station 102 may configure a set of time-and-frequency resources as a CMR set and another set of time-and-frequency resources as an IMR set for the UE 104. The UE 104 may use the CMR and the IMR set to perform L1-SINR and/or L1-RSRP measurements on one or more beams in each subband. In some examples, the CMR is transmitted by the base station 102 via downlink signaling, while the IMR is transmitted by one or more UEs 704 via uplink signaling to the base station 102 or another base station. Accordingly, in some examples, the per-subband beam report configuration may include or indicate quasi-collocation (QCL) information for each resource configured as a CMR in the CMR set or an IMR in the IMR set. The QCL information may indicate to the UE 104 which downlink resources to be used for receiving the CMR and which corresponding uplink resources may be used for receiving IMR, thereby enabling the UE 104 to perform CLI measurements.

In some examples, the per-subband beam report configuration may configure the UE 104 with a reporting frequency, or a rate of recurrence, for controlling how frequently the UE 104 may provide a per-subband beam report to the base station 102. The base station 102 may configure the UE 104 to provide the per-subband beam report on a periodic basis, a semi-persistent basis, an aperiodic basis, and/or an event triggered basis. For example, the base station 102 may instruct the UE 102 to transmit the beam report periodically by indicating a particular period of time between reports. In another example, the base station may provide the UE 104 with threshold L1-SINR and/or L1-RSRP value(s) such that the UE 104 provides the beam report to the base station 102 when the threshold is met (e.g., when a threshold condition is satisfied). In some examples, the base station 102 may configure the UE 104 with one or both of periodic and semi-persistent parameters.

At a second step 708, the base station 102 may transmit the per-subband beam report configuration to the UE 104 via higher layer signaling (e.g., via MAC CE, or RRC signaling). The configurations may be stored in the UE 104. Once configured, the UE 104 may listen for CMR and IMR indicated by the per-subband beam report configuration.

For example, in a third step 710, the UE 104 may receive uplink signaling 712 from one or more other UEs 704 as well as downlink signaling 714 from the base station 102. Here, as illustrated in FIGS. 6A and 6B, the UE 104 may receive and measure CMR and IMR for one or more beams associated with one or more subbands to determine the CLI impact on the beams of each subband. Because the base station 102 is full duplex, the CMR and IMR may be received simultaneously. For example, the UE 104 may receive, over a first downlink subband, CMR1 over a first beam and CMR2 over a second beam. The UE 104 may also receive, over a second downlink subband, CMR1 over the first beam and CMR2 over the second beam. The UE 104 may also receive IMR (e.g., resources, designated by the base station, of uplink signaling from one or more other UEs 704) as interference in one or more of the downlink beams in one or more of the subbands. The UE 104 may use the received CMR and IMR to measure the CLI impact on each beam in each subband.

In a fourth step 716, the UE 104 may generate a beam management report based on measurements made in the third step 710. The report may include an indication of one or more beams (e.g., preferred beams) for each subband with the lowest relative CLI among other beams of the same subband. In some examples, the UE 104 may identify the preferred beams by providing an indication of a CMR corresponding to each of the preferred beams in the report, wherein the report maps the CMR corresponding to each of the preferred beams to a corresponding subband. In another example, the UE 104 may identify the preferred beams by providing an indication of a calculated L1-SINR and/or L1-RSRP for each of the preferred beams, wherein the report maps the calculated L1-SINR and/or L1-RSRP to the preferred beams and their corresponding subband. In some examples, the report may be in a table form, wherein each row corresponds to a subband, and one or more columns are populated with an indication of the preferred beam(s) (e.g., top x beams). As such, the UE may generate a report that indicates the top x preferred CMRs and/or beams per downlink subband.

At a fifth step 718, the UE 104 may transmit the per-subband beam report to the base station 102 via higher layer signaling (e.g., via MAC CE, or RRC signaling) of any suitable uplink signaling. The report and contents thereof may be stored in the base station 102. With the information provided in the report, the base station 102 may consider the best beams or beam pairs to use for scheduling the UE 104 to a particular subband (e.g., frequency domain multiplexing multiple UEs on different downlink subbands with consideration of CLI impact on downlink quality).

Figure 8:
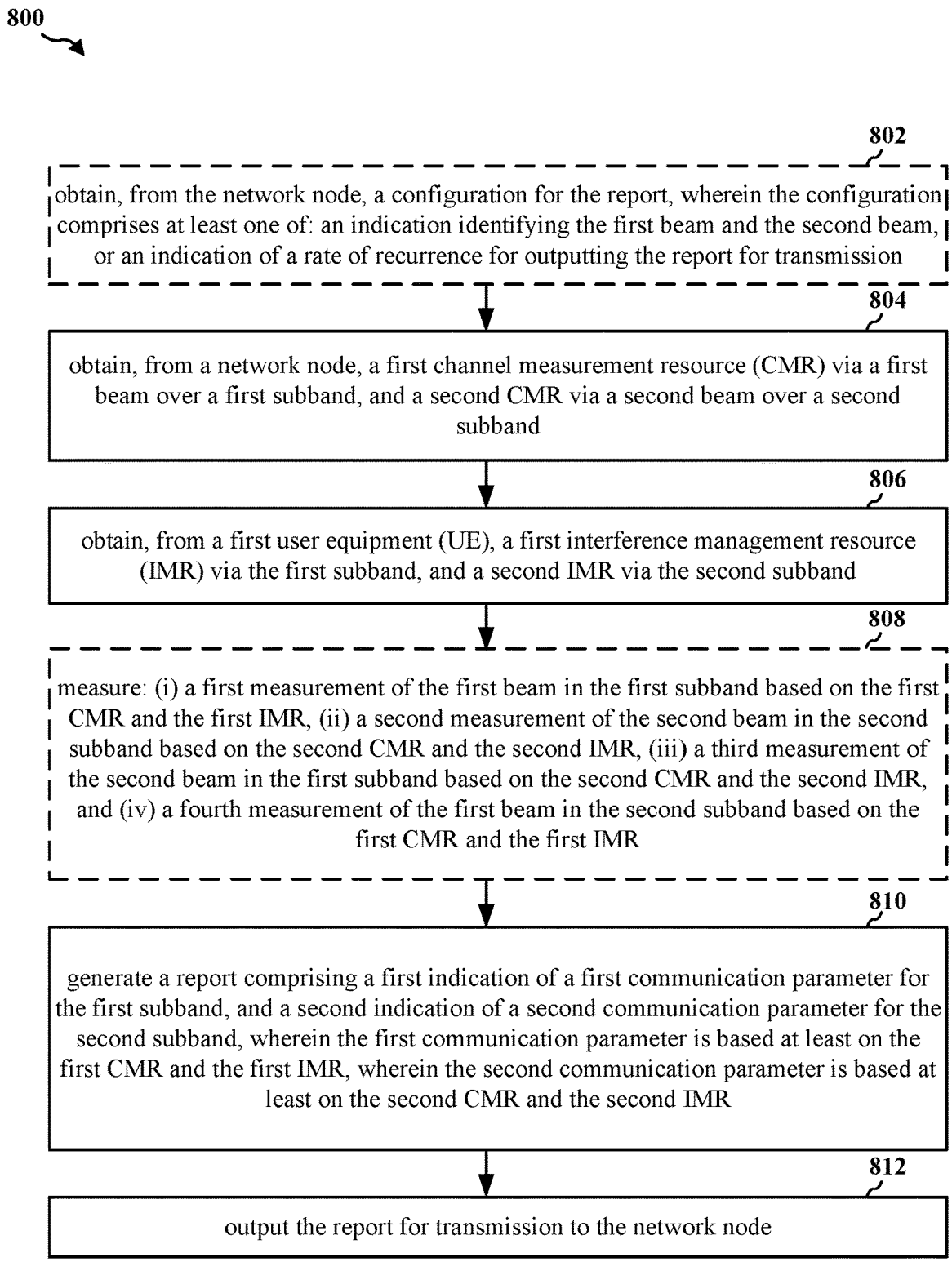
FIG. 8 is a flowchart of a method of wireless communication.

FIG. 8 is a flowchart 800 of a method of wireless communication. The method may be performed by a UE (e.g., the UE 104; the apparatus 902). At 802, the UE may optionally obtain, from the network node, a configuration for the report, wherein the configuration comprises at least one of: an indication identifying the first beam and the second beam, or an indication of a rate of recurrence for outputting the report for transmission. For example, 802 may be performed by a receiving component 940 of the apparatus 902. Here, the base station may generate a configuration for the reporting, including a frequency for a periodic or semi-persistent reporting, and/or an indication of one or more CMRs and IMRs. That is, the information may configure the UE to receive and measure CMR and IMR resources, and generate a report based on the measurements. The information may configure the UE to transmit the report to the base station at recurring rate. For example, the recurring rate for outputting the report for transmission may be periodic, semi-persistent, aperiodic, or event triggered.

At 804, the UE may obtain, from a network node, a first channel measurement resource (CMR) via a first beam over a first subband, and a second CMR via a second beam over a second subband. For example, 804 may be performed by the receiving component 940 of the apparatus 902. Here, the UE may be configured to receive and measure resources that are designated as CMR resources in the configuration message received at 802.

At 806, the UE may obtain, from a first user equipment (UE), a first interference management resource (IMR) via the first subband, and a second IMR via the second subband. For example, 804 may be performed by the receiving component 940 of the apparatus 902. Here, the UE may be configured to receive resources that are designated as IMR resources in the configuration message received at 802.

At 808, the UE may optionally measure: (i) a first measurement of the first beam in the first subband based on the first CMR and the first IMR, (ii) a second measurement of the second beam in the second subband based on the second CMR and the second IMR, (iii) a third measurement of the second beam in the first subband based on the second CMR and the second IMR, and (iv) a fourth measurement of the first beam in the second subband based on the first CMR and the first IMR. For example, 808 may be performed by the measuring component 942 of the apparatus 902. Here, the UE may use the CMRs and IMRs to measure CLI caused by uplink signaling from a UE (e.g., intra-cell interference or inter-cell interference). Because the base station is a full-duplex base station, the base station may transmit a downlink communication to the UE while also receiving an uplink communication from another UE. In some examples, the base station may configure the UE with additional beams for downlink communication over the two subbands.

At 810, the UE may generate a report comprising a first indication of a first communication parameter for the first subband, and a second indication of a second communication parameter for the second subband, wherein the first communication parameter is based at least on the first CMR and the first IMR, wherein the second communication parameter is based at least on the second CMR and the second IMR. For example, 810 may be performed by the generating component 946 of the apparatus 902.

At 812, the UE may output the report for transmission to the network node. For example, 812 may be performed by the transmitting component 944 of the apparatus 902. Here, the UE may transmit a report generated based on the measuring of the CMRs and IMRs to notify the base station of which beams over which subbands are the least affected by CLI.

In certain aspects, the first beam is defined by a first spatial direction and the second beam is defined by a second spatial direction.

In certain aspects, the first beam and the second beam are defined by a same spatial direction.

In certain aspects, the first communication parameter comprises a first level-one signal-to-interference-plus-noise ratio (L1-SINR) based at least on a signal strength of the first CMR and a signal strength of the first IMR, or a first level-one reference signal received power (L1-RSRP) based at least on the signal strength of the first CMR; and the second communication parameter comprises a second L1-SINR based at least on a signal strength of the second CMR and a signal strength of the second IMR, or a second L1-RSRP based at least on the signal strength of the second CMR.

In certain aspects, the rate of recurrence is periodic, semi-persistent, aperiodic, or event triggered.

In certain aspects, the configuration for the report further comprises one or more indications of the first CMR, the second CMR, the first IMR, and the second IMR.

In certain aspects, the first CMR is obtained via the first beam over the first subband and the second subband, and wherein the second CMR is obtained via the second beam over the first subband and the second subband.

In certain aspects, the first communication parameter for the first subband comprises one of the first measurement or the third measurement based on which is indicative of a lowest level of measured interference, and wherein the second communication parameter for the second subband comprises one of the second measurement or the fourth measurement based on which is indicative of a lowest level of measured interference.

In certain aspects, the first communication parameter for the first subband comprises one of the first measurement or the third measurement based on which is indicative of a highest signal strength, and wherein the second communication parameter for the second subband comprises one of the second measurement or the fourth measurement based on which is indicative of a highest signal strength.

In certain aspects, the first communication parameter for the first subband comprises an indication of the first beam or the second beam based on which has a highest signal-to-interference-plus-noise ratio (SINR) over the first subband, and wherein the second communication parameter for the second subband comprises an indication of the first beam or the second beam based on which has a highest SINR over the second subband.

In certain aspects, the report maps the indication of the first communication parameter to the first subband, and wherein the report maps the indication of the second communication parameter to the second subband.

Figure 9:
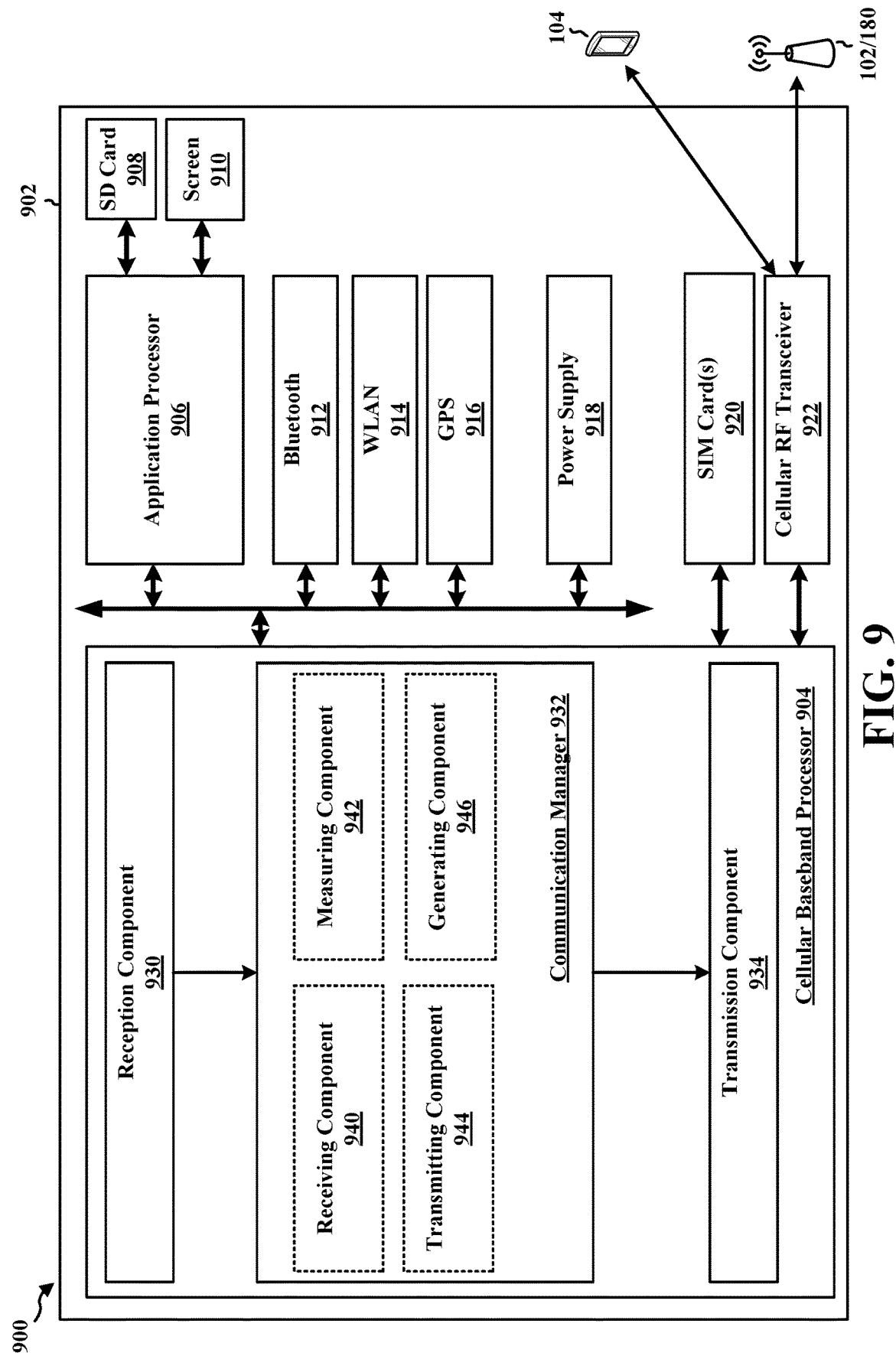
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 104 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., UE 104 of FIGS. 1 and 3) and include the aforediscussed additional modules of the apparatus 902.

The communication manager 932 includes a receiving component 940 that is configured to obtain, from the network node, a configuration for the report, wherein the configuration comprises at least one of: an indication identifying the first beam and the second beam, or an indication of a rate of recurrence for outputting the report for transmission; obtain, from a network node, a first channel measurement resource (CMR) via a first beam over a first subband, and a second CMR via a second beam over a second subband; and obtain, from a first user equipment (UE), a first interference management resource (IMR) via the first subband, and a second IMR via the second subband; e.g., as described in connection with 802, 804, and 806 of FIG. 8.

The communication manager 932 further includes a measuring component 942 configured to measure: (i) a first measurement of the first beam in the first subband based on the first CMR and the first IMR, (ii) a second measurement of the second beam in the second subband based on the second CMR and the second IMR, (iii) a third measurement of the second beam in the first subband based on the second CMR and the second IMR, and (iv) a fourth measurement of the first beam in the second subband based on the first CMR and the first IMR; e.g., as described in connection with 808 of FIG. 8.

The communication manager 932 further includes a transmitting component 944 configured to output the report for transmission to the network node; e.g., as described in connection with 812 of FIG. 8.

The communication manager 932 further includes a generating component 946 configured to generate a report comprising a first indication of a first communication parameter for the first subband, and a second indication of a second communication parameter for the second subband, wherein the first communication parameter is based at least on the first CMR and the first IMR, wherein the second communication parameter is based at least on the second CMR and the second IMR; e.g., as described in connection with 810 of FIG. 8.

The apparatus may include additional components that perform each of the blocks of the algorithm in the aforementioned flowchart of FIG. 8. As such, each block in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for obtaining, from the network node, a configuration for the report, wherein the configuration comprises at least one of: an indication identifying the first beam and the second beam, or an indication of a rate of recurrence for outputting the report for transmission.

In one configuration, the apparatus 902, and in particular the cellular baseband processor 904, includes means for obtaining, from a network node, a first channel measurement resource (CMR) via a first beam over a first subband, and a second CMR via a second beam over a second subband.

In one configuration, the apparatus 902, and in particular the cellular baseband processor 904, includes means for obtaining, from a first user equipment (UE), a first interference management resource (IMR) via the first subband, and a second IMR via the second subband.

In one configuration, the apparatus 902, and in particular the cellular baseband processor 904, includes means for measuring: (i) a first measurement of the first beam in the first subband based on the first CMR and the first IMR, (ii) a second measurement of the second beam in the second subband based on the second CMR and the second IMR, (iii) a third measurement of the second beam in the first subband based on the second CMR and the second IMR, and (iv) a fourth measurement of the first beam in the second subband based on the first CMR and the first IMR.

In one configuration, the apparatus 902, and in particular the cellular baseband processor 904, includes means for generating a report comprising a first indication of a first communication parameter for the first subband, and a second indication of a second communication parameter for the second subband, wherein the first communication parameter is based at least on the first CMR and the first IMR, wherein the second communication parameter is based at least on the second CMR and the second IMR.

In one configuration, the apparatus 902, and in particular the cellular baseband processor 904, includes means for outputting the report for transmission to the network node.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
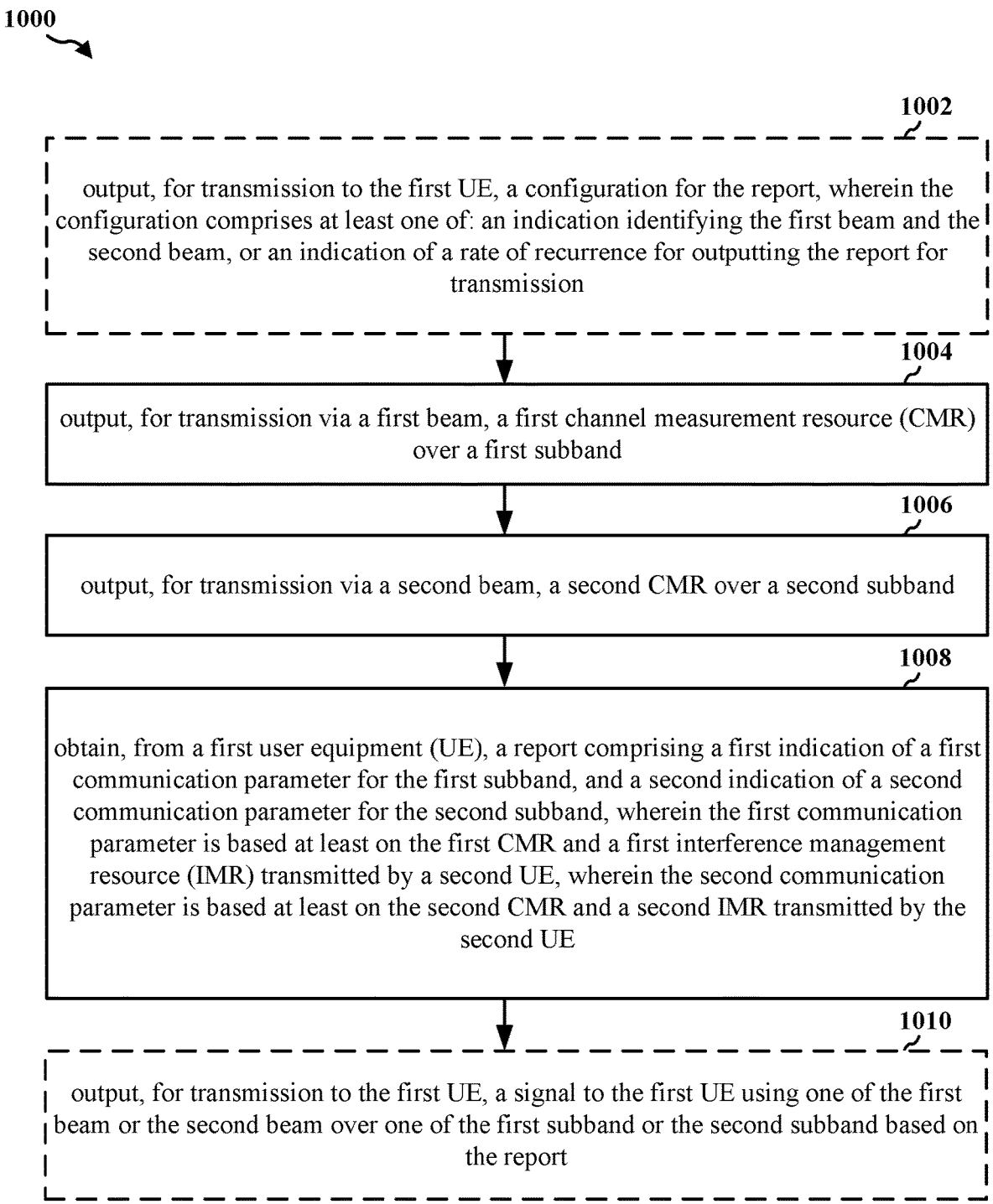
FIG. 10 is a flowchart of a method of wireless communication.

FIG. 10 is a flowchart 1000 of a method of wireless communication. The method may be performed by a base station (e.g., the network node or base station 102/180; the apparatus 1102). At 1002, the base station may optionally output, for transmission to the first UE, a configuration for the report, wherein the configuration comprises at least one of: an indication identifying the first beam and the second beam, or an indication of a rate of recurrence for outputting the report for transmission. For example, 1002 may be performed by a transmitting component 1140 of FIG. 11.

At 1004, the base station may output, for transmission via a first beam, a first channel measurement resource (CMR) over a first subband. For example, 1004 may be performed by the transmitting component 1140 of FIG. 11.

At 1006, the base station may output, for transmission via a second beam, a second CMR over a second subband. For example, 1006 may be performed by the transmitting component 1140 of FIG. 11.

At 1008, the base station may obtain, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE. For example, 1008 may be performed by the receiving component 1142 of FIG. 11.

At 1010, the base station may output, for transmission to the first UE, a signal to the first UE using one of the first beam or the second beam over one of the first subband or the second subband based on the report. For example, 1010 may be performed by the transmitting component 1140 of FIG. 11.

In certain aspects, the first beam is defined by a first spatial direction and the second beam is defined by a second spatial direction.

In certain aspects, the first beam and the second beam are defined by a same spatial direction.

In certain aspects, the first communication parameter comprises a first level-one signal-to-interference-plus-noise ratio (L1-SINR) based at least on a signal strength of the first CMR and a signal strength of the first IMR, or a first level-one reference signal received power (L1-RSRP) based at least on the signal strength of the first CMR; and the second communication parameter comprises a second L1-SINR based at least on a signal strength of the second CMR and a signal strength of the second IMR, or a second L1-RSRP based at least on the signal strength of the second CMR.

In certain aspects, the rate of recurrence is periodic, semi-persistent, aperiodic, or event triggered.

In certain aspects, the configuration for the report further comprises one or more indications of the first CMR, the second CMR, the first IMR, and the second IMR.

In certain aspects, the apparatus is configured for full duplex communication.

In certain aspects, the report maps the indication of the first communication parameter to the first subband, and wherein the report maps the indication of the second communication parameter to the second subband.

Figure 11:
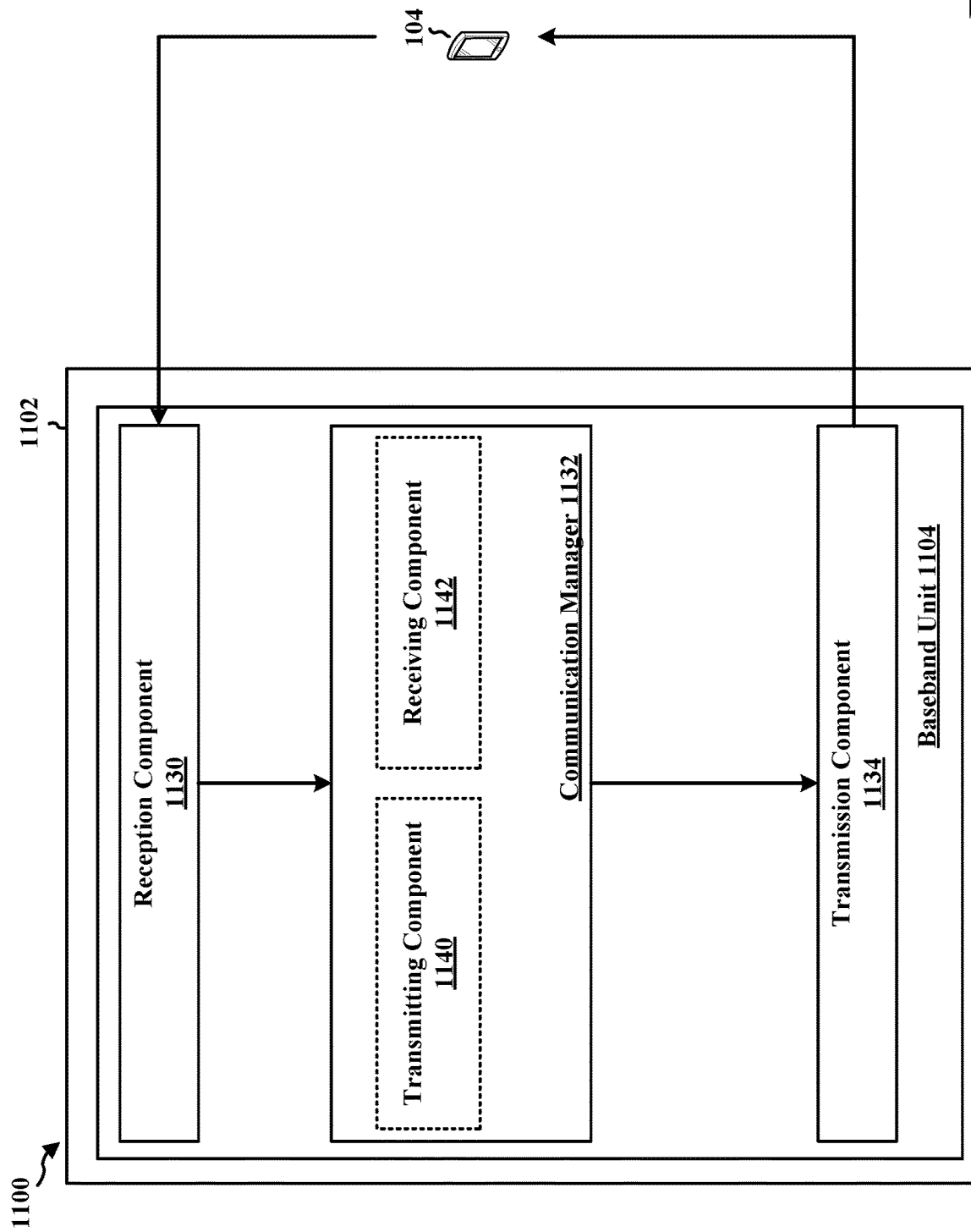
FIG. 11 is a diagram illustrating another example of a hardware implementation for another example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 102 and may include the memory 376 and/or at least one of the TX processor 316, the RX processor 370, and the controller/processor 375.

The communication manager 1132 includes a transmitting component 1140 configured to output, for transmission to the first UE, a configuration for the report, wherein the configuration comprises at least one of: an indication identifying the first beam and the second beam, or an indication of a rate of recurrence for outputting the report for transmission; output, for transmission via a first beam, a first channel measurement resource (CMR) over a first subband; output, for transmission via a second beam, a second CMR over a second subband; and output, for transmission to the first UE, a signal to the first UE using one of the first beam or the second beam over one of the first subband or the second subband based on the report; e.g., as described in connection with 1002, 1004, 1006, and 1010 of FIG. 10.

The communication manager 1132 further includes a receiving component 1142 configured to obtain, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE; e.g., as described in connection with 1008 of FIG. 10.

The apparatus may include additional components that perform each of the blocks of the algorithm in the aforementioned flowchart of FIG. 10. As such, each block in FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for outputting, for transmission to the first UE, a configuration for the report, wherein the configuration comprises at least one of: an indication identifying the first beam and the second beam, or an indication of a rate of recurrence for outputting the report for transmission.

In one configuration, the apparatus 1102, and in particular the baseband unit 1104, includes means for outputting, for transmission via a first beam, a first channel measurement resource (CMR) over a first subband.

In one configuration, the apparatus 1102, and in particular the baseband unit 1104, includes means for outputting, for transmission via a second beam, a second CMR over a second subband.

In one configuration, the apparatus 1102, and in particular the baseband unit 1104, includes means for obtaining, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE.

In one configuration, the apparatus 1102, and in particular the baseband unit 1104, includes means for output, for transmission to the first UE, a signal to the first UE using one of the first beam or the second beam over one of the first subband or the second subband based on the report.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method for wireless communication by a first user equipment, comprising: obtaining, from a network node, a first channel measurement resource (CMR) via a first beam over a first subband, and a second CMR via a second beam over a second subband; obtaining, from a second user equipment (UE), a first interference management resource (IMR) via the first subband, and a second IMR via the second subband; generating a report comprising a first indication of a first communication parameter for the first subband, and a second indication of a second communication parameter for the second subband, wherein the first communication parameter is based at least on the first CMR and the first IMR, wherein the second communication parameter is based at least on the second CMR and the second IMR; and outputting the report for transmission to the network node.

Example 2 is the method of example 1, wherein the first beam is defined by a first spatial direction and the second beam is defined by a second spatial direction.

Example 3 is the method of example 1, wherein the first beam and the second beam are defined by a same spatial direction.

Example 4 is the method of any of examples 1-3, wherein: the first communication parameter comprises a first level-one signal-to-interference-plus-noise ratio (L1-SINR) based at least on a signal strength of the first CMR and a signal strength of the first IMR, or a first level-one reference signal received power (L1-RSRP) based at least on the signal strength of the first CMR; and the second communication parameter comprises a second L1-SINR based at least on a signal strength of the second CMR and a signal strength of the second IMR, or a second L1-RSRP based at least on the signal strength of the second CMR.

Example 5 is the method of any of examples 1-4, further comprising: obtaining, from the network node, a configuration for the report, wherein the configuration comprises at least one of: an indication identifying the first beam and the second beam, or an indication of a rate of recurrence for outputting the report for transmission.

Example 6 is the method of example 5, wherein the rate of recurrence is periodic, semi-persistent, aperiodic, or event triggered.

Example 7 is the method of example 5, wherein the configuration for the report further comprises one or more indications of the first CMR, the second CMR, the first IMR, and the second IMR.

Example 8 is the method of any of examples 1-7 wherein the first CMR is obtained via the first beam over the first subband and the second subband, and wherein the second CMR is obtained via the second beam over the first subband and the second subband.

Example 9 is the method of example 8, further comprising: measuring: (i) a first measurement of the first beam in the first subband based on the first CMR and the first IMR, (ii) a second measurement of the second beam in the second subband based on the second CMR and the second IMR, (iii) a third measurement of the second beam in the first subband based on the second CMR and the second IMR, and (iv) a fourth measurement of the first beam in the second subband based on the first CMR and the first IMR.

Example 10 is the method of example 9, wherein the first communication parameter for the first subband comprises one of the first measurement or the third measurement based on which is indicative of a lowest level of measured interference, and wherein the second communication parameter for the second subband comprises one of the second measurement or the fourth measurement based on which is indicative of a lowest level of measured interference.

Example 11 is the method of example 9, wherein the first communication parameter for the first subband comprises one of the first measurement or the third measurement based on which is indicative of a highest signal strength, and wherein the second communication parameter for the second subband comprises one of the second measurement or the fourth measurement based on which is indicative of a highest signal strength.

Example 12 is the method of example 9, wherein the first communication parameter for the first subband comprises an indication of the first beam or the second beam based on which has a highest signal-to-interference-plus-noise ratio (SINR) over the first subband, and wherein the second communication parameter for the second subband comprises an indication of the first beam or the second beam based on which has a highest SINR over the second subband.

Example 13 is the method of any of examples 1-12, wherein the report maps the indication of the first communication parameter to the first subband, and wherein the report maps the indication of the second communication parameter to the second subband.

Example 14 is a method for wireless communication by a network node, comprising: outputting, for transmission via a first beam, a first channel measurement resource (CMR) over a first subband; outputting, for transmission via a second beam, a second CMR over a second subband; and obtaining, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE.

Example 15 is method of example 14, wherein the first beam is defined by a first spatial direction and the second beam is defined by a second spatial direction.

Example 16 is the method of example 14, wherein the first beam and the second beam are defined by a same spatial direction.

Example 17 is the method of examples 14-16, wherein: the first communication parameter comprises a first level-one signal-to-interference-plus-noise ratio (L1-SINR) based at least on a signal strength of the first CMR and a signal strength of the first IMR, or a first level-one reference signal received power (L1-RSRP) based at least on the signal strength of the first CMR; and the second communication parameter comprises a second L1-SINR based at least on a signal strength of the second CMR and a signal strength of the second IMR, or a second L1-RSRP based at least on the signal strength of the second CMR.

Example 18 is the method of any of examples 14-17, further comprising: outputting, for transmission to the first UE, a configuration for the report, wherein the configuration comprises at least one of: an indication identifying the first beam and the second beam, or an indication of a rate of recurrence for outputting the report for transmission.

Example 19 is the method of example 18, wherein the rate of recurrence is periodic, semi-persistent, aperiodic, or event triggered.

Example 20 is the method of example 18, wherein the configuration for the report further comprises one or more indications of the first CMR, the second CMR, the first IMR, and the second IMR.

Example 21 is method of any of examples 14-20, further comprising: outputting, for transmission to the first UE, a signal to the first UE using one of the first beam or the second beam over one of the first subband or the second subband based on the report.

Example 22 is the method of any of examples 14-21, wherein the network node is configured for full duplex communication.

Example 23 is the method of any of examples 14-22, wherein the report maps the indication of the first communication parameter to the first subband, and wherein the report maps the indication of the second communication parameter to the second subband.

Example 24 is a user equipment (UE), comprising: a transceiver; a memory comprising instructions; and one or more processors configured to execute the instructions to cause the UE to perform a method in accordance with any one of examples 1-13, wherein the transceiver is configured to: receive, from a network node, a first channel measurement resource (CMR) via a first beam over a first subband, and a second CMR via a second beam over a second subband; receive, from a second user equipment (UE), a first interference management resource (IMR) via the first subband, and a second IMR via the second subband; and transmit the report to the network node.

Example 25 is a network node, comprising: a transceiver; a memory comprising instructions; and one or more processors configured to execute the instructions and cause the network node to perform a method in accordance with any one of examples 14-23, wherein the transceiver is configured to: transmit, via a first beam, a first channel measurement resource (CMR) over a first subband; transmit, via a second beam, a second CMR over a second subband; and receive, from a first user equipment (UE), a report comprising a first indication of a first communication parameter for the first subband, and a second indication of a second communication parameter for the second subband, wherein the first communication parameter is based at least on the first CMR and a first interference management resource (IMR) transmitted by a second UE, wherein the second communication parameter is based at least on the second CMR and a second IMR transmitted by the second UE.

Example 26 is an apparatus for wireless communications, comprising means for performing a method in accordance with any one of examples 1-13.

Example 27 is an apparatus for wireless communications, comprising means for performing a method in accordance with any one of examples 14-23.

Example 28 is a non-transitory computer-readable medium comprising instructions that, when executed by an apparatus, cause the apparatus to perform a method in accordance with any one of examples 1-13.

Example 29 is a non-transitory computer-readable medium comprising instructions that, when executed by an apparatus, cause the apparatus to perform a method in accordance with any one of examples 14-23.

Example 30 is an apparatus for wireless communications, comprising: a memory comprising instructions; and one or more processors configured to execute the instructions to cause the apparatus to perform a method in accordance with any one of examples 1-13.

Example 31 is apparatus for wireless communications, comprising: a memory comprising instructions; and one or more processors configured to execute the instructions to cause the apparatus to perform a method in accordance with any one of examples 14-23.

What is claimed is:

1. A second user equipment, comprising:
at least one transceiver;
at least one memory comprising instructions; and
one or more processors configured to execute the instructions to cause the second user equipment to:
receive, via the at least one transceiver and from a network node, a first channel measurement resource (CMR) via a first beam over a first subband, and a second CMR via a second beam over a second subband;
receive, via the at least one transceiver and from a first user equipment (UE), a first interference management resource (IMR) via the first subband, and a second IMR via the second subband;
generate a report comprising a first indication of a first communication parameter, the first communication parameter being associated with the first subband, and a second indication of a second communication parameter, the second communication parameter being associated with the second subband, wherein the first communication parameter is based at least on the first CMR and the first IMR, wherein the second communication parameter is based at least on the second CMR and the second IMR; and
transmit the report to the network node.

2. The second user equipment of claim 1, wherein the first beam is defined by a first spatial direction and the second beam is defined by a second spatial direction.

3. The second user equipment of claim 1, wherein the first beam and the second beam are defined by a same spatial direction.

4. The second user equipment of claim 1, wherein:
the first communication parameter comprises a first level-one signal-to-interference-plus-noise ratio (L1-SINR) based at least on a signal strength of the first CMR and a signal strength of the first IMR, or a first level-one reference signal received power (L1-RSRP) based at least on the signal strength of the first CMR; and
the second communication parameter comprises a second L1-SINR based at least on a signal strength of the second CMR and a signal strength of the second IMR, or a second L1-RSRP based at least on the signal strength of the second CMR.

5. The second user equipment of claim 1, wherein the one or more processors are further configured to execute the instructions to cause the second user equipment to:
receive, via the at least one transceiver and from the network node, a configuration for the report, wherein the configuration comprises at least one of:
an indication identifying the first beam and the second beam, or
an indication of a rate of recurrence for transmitting the report.

6. The second user equipment of claim 5, wherein the rate of recurrence is periodic, semi-persistent, aperiodic, or event triggered.

7. The second user equipment of claim 5, wherein the configuration for the report further comprises one or more indications of the first CMR, the second CMR, the first IMR, and the second IMR.

8. The second user equipment of claim 1, wherein the first CMR is received via the first beam over the first subband and the second subband, and wherein the second CMR is received via the second beam over the first subband and the second subband.

9. The second user equipment of claim 8, wherein the one or more processors are further configured to execute the instructions to cause the second user equipment to:
measure: (i) a first measurement of the first beam in the first subband based on the first CMR and the first IMR, (ii) a second measurement of the second beam in the second subband based on the second CMR and the second IMR, (iii) a third measurement of the second beam in the first subband based on the second CMR and the second IMR, and (iv) a fourth measurement of the first beam in the second subband based on the first CMR and the first IMR.

10. The second user equipment of claim 9, wherein the first communication parameter associated with the first subband comprises one of the first measurement or the third measurement based on which is indicative of a lowest level of measured interference, and wherein the second communication parameter associated with the second subband comprises one of the second measurement or the fourth measurement based on which is indicative of a lowest level of measured interference.

11. The second user equipment of claim 9, wherein the first communication parameter associated with the first subband comprises one of the first measurement or the third measurement based on which is indicative of a highest signal strength, and wherein the second communication parameter associated with the second subband comprises one of the second measurement or the fourth measurement based on which is indicative of a highest signal strength.

12. The second user equipment of claim 9, wherein the first communication parameter associated with the first subband comprises an indication of the first beam or the second beam based on which has a highest signal-to-interference-plus-noise ratio (SINR) over the first subband, and wherein the second communication parameter associated with the second subband comprises an indication of the first beam or the second beam based on which has a highest SINR over the second subband.

13. The second user equipment of claim 1, wherein the report maps the indication of the first communication parameter to the first subband, and wherein the report maps the indication of the second communication parameter to the second subband.

14. A network node, comprising:
at least one transceiver;
at least one memory comprising instructions; and
one or more processors configured to execute the instructions to cause the network node to:
transmit, via the at least one transceiver and a first beam, a first channel measurement resource (CMR) over a first subband;
transmit, via the at least one transceiver and a second beam, a second CMR over a second subband;
receive, via the at least one transceiver and from a first user equipment (UE), a first interference management resource (IMR) via the first subband, and a second IMR via the second subband; and receive, via the at least one transceiver and from a second UE, a report comprising a first indication of a first communication parameter, the first communication parameter being associated with the first subband, and a second indication of a second communication parameter, the second communication parameter being associated with the second subband, wherein the first communication parameter is based at least on the first CMR and the first IMR, wherein the second communication parameter is based at least on the second CMR and the second IMR.

15. The network node of claim 14, wherein the first beam is defined by a first spatial direction and the second beam is defined by a second spatial direction.

16. The network node of claim 14, wherein the first beam and the second beam are defined by a same spatial direction.

17. The network node of claim 14, wherein:
the first communication parameter comprises a first level-one signal-to-interference-plus-noise ratio (L1-SINR) based at least on a signal strength of the first CMR and a signal strength of the first IMR, or a first level-one reference signal received power (L1-RSRP) based at least on the signal strength of the first CMR; and
the second communication parameter comprises a second L1-SINR based at least on a signal strength of the second CMR and a signal strength of the second IMR, or a second L1-RSRP based at least on the signal strength of the second CMR.

18. The network node of claim 14, wherein the one or more processors are further configured to execute the instructions to cause the network node to:
transmit, via the at least one transceiver and to the second UE, a configuration for the report, wherein the configuration comprises at least one of:
an indication identifying the first beam and the second beam, or
an indication of a rate of recurrence for transmitting the report.

19. The network node of claim 18, wherein the rate of recurrence is periodic, semi-persistent, aperiodic, or event triggered.

20. The network node of claim 18, wherein the configuration for the report further comprises one or more indications of the first CMR, the second CMR, the first IMR, and the second IMR.

21. The network node of claim 14, wherein the one or more processors are further configured to execute the instructions to cause the network node to:
transmit, via the at least one transceiver and to the second UE, a signal using one of the first beam or the second beam over one of the first subband or the second subband based on the report.

22. The network node of claim 14, wherein the network node is configured for full duplex communication.

23. The network node of claim 14, wherein the report maps the indication of the first communication parameter to the first subband, and wherein the report maps the indication of the second communication parameter to the second subband.

24. A method for wireless communication by a first network node, comprising:
receiving, from a second network node, a first channel measurement resource (CMR) via a first beam over a first subband, and a second CMR via a second beam over a second subband;
receiving, from a user equipment (UE), a first interference management resource (IMR) via the first subband, and a second IMR via the second subband;
generating a report comprising a first indication of a first communication parameter, the first communication parameter being associated with the first subband, and a second indication of a second communication parameter, the second communication parameter being associated with the second subband, wherein the first communication parameter is based at least on the first CMR and the first IMR, wherein the second communication parameter is based at least on the second CMR and the second IMR; and
transmitting the report to the second network node.

25. The method of claim 24, wherein:
the first communication parameter comprises a first level-one signal-to-interference-plus-noise ratio (L1-SINR) based at least on a signal strength of the first CMR and a signal strength of the first IMR, or a first level-one reference signal received power (L1-RSRP) based at least on the signal strength of the first CMR; and
the second communication parameter comprises a second L1-SINR based at least on a signal strength of the second CMR and a signal strength of the second IMR, or a second L1-RSRP based at least on the signal strength of the second CMR.

26. The method of claim 24, further comprising:
receiving, from the second network node, a configuration for the report, wherein the configuration comprises at least one of:
an indication identifying the first beam and the second beam, or
an indication of a rate of recurrence for transmitting the report.

27. The method of claim 26, wherein the rate of recurrence is periodic, semi-persistent, aperiodic, or event triggered.

28. The method of claim 24, wherein the first CMR is received via the first beam over the first subband and the second subband, and wherein the second CMR is received via the second beam over the first subband and the second subband.

* * * * *